United States Patent [19]

Otsuka

[11] 4,254,068
[45] Mar. 3, 1981

[54] METHOD AND APPARATUS FOR REGENERATING FOAMED PLASTICS

[75] Inventor: Kazuo Otsuka, Tokyo, Japan

[73] Assignee: Otsuka Sangyo Kabushiki Kaisha, Tokyo, Japan

[21] Appl. No.: 970,850

[22] Filed: Dec. 19, 1978

[51] Int. Cl.³ .............................................. B29C 29/00
[52] U.S. Cl. ..................................... 264/37; 264/321; 264/DIG. 69; 425/196; 425/223; 425/DIG. 46
[58] Field of Search ............... 264/321, 320, DIG. 69, 264/37; 425/4 C, 4 R, 817 C, DIG. 46, 223, 196

[56] References Cited

U.S. PATENT DOCUMENTS

| | | | |
|---|---|---|---|
| 3,504,399 | 4/1970 | Wolf | 425/4 C |
| 3,531,562 | 9/1970 | Serrano et al. | 425/4 C X |
| 3,607,999 | 9/1971 | Corbett et al. | 425/4 C X |
| 3,922,131 | 11/1975 | Stegmeier | 425/817 C X |
| 4,067,826 | 1/1978 | Emery | 264/DIG. 69 |

FOREIGN PATENT DOCUMENTS 2656484  10/1977  Fed. Rep. of Germany ... 264/DIG. 69

*Primary Examiner*—Philip Anderson
*Attorney, Agent, or Firm*—Gordon W. Hueschen

[57] ABSTRACT

A regenerating apparatus for foamed plastics comprising two rollers connected to driving means capable of rotation toward inside respectively and mounted horizontally in parallel with each other at a predetermined gap, a heating means incorporated to the inside of the rollers, and a scraping means for molten plastics provided to the outside of at least one of the rollers in contaction with the surface thereof.

14 Claims, 3 Drawing Figures

METHOD AND APPARATUS FOR REGENERATING FOAMED PLASTICS

BACKGROUND OF THE INVENTION

1. Field of the Invention

The present invention relates to a regenerating method and apparatus for foamed plastics and, particularly, to a regenerating method and apparatus for melting scraps of foamed plastics while defoaming them to recover original plastics.

2. Description of the Prior Art

Foamed plastics such as foamed polystyrene, foamed polyethylene and foamed ethylene-vinyl acetate copolymer are widely used as cushioning materials, heat insulation materials and the like, but a great amount of chips are resulted as scraps upon production of desired articles from these materials, as well as these articles, for example, cushioning materials employed for packaging various goods often produce a lot of wastes as scraps after the opening of the packages. Combustion and depolymerization methods are known for the disposal of such used foamed plastics.

The former method is, however, defective in that it not only tends to damage incinerators because of extremely high combustion temperature but also produces a lot of smokes leading to atmospheric pollution, as well as consumed plastics as useful resources in vain. While on the other hand, although polystyrene can be recovered to some extent by the latter method, it has also defects that it requires a great installation cost and produces the recovered products in the form of monomer and the depolymerization is very difficult for polyethylene and the like.

It is accordingly one object of the present invention to provide a novel regenerating method and apparatus for foamed plastics.

Another object of the present invention is to provide a regenerating method and apparatus for melting foamed plastics thus to recover original plastics.

SUMMARY OF THE INVENTION

The foregoing object of the present invention can be attained by the provision and use of a regenerating apparatus for foamed plastics comprising two rollers connected to driving means capable of rotating them so that their top surfaces move toward each other and mounted horizontally in parallel with each other at a predetermined gap, a heating means inside of at least one of the rollers having a heating capacity sufficient to melt the plastic material on the surface thereof, feeding means above the gap for feeding particles of foamed plastic material to the upper surface of the rollers, and scraping means operative to remove a portion of the molten plastic material from the outside of at least one of the rollers and to allow the remainder thereof to stay on the roller for at least one more pass by the feeding means.

The apparatus in accordance with the present invention is useful for regeneration of scraps of foam plastics once used for packaging material, packing material, heat insulation material, and the like, which have often been left as they are because of the difficulty in their recovery and provides an economical apparatus and process which enables one to recover such scrap foam products with ease as defoamed resin blocks.

The foamed plastics regenerated by the apparatus in accordance with the present invention include preferably thermoplastic foamed resin such as foamed polystyrene, foamed polyethylene, foamed polypropylene, foamed ethylene-vinyl acetate copolymer and foamed polyurethane, with foamed polystyrene being particularly preferred.

BRIEF DESCRIPTION OF THE INVENTION

The present invention will be understood best in connection with the accompanying drawings wherein.

PREFERRED EMBODIMENT OF THE INVENTION

Figure 1:
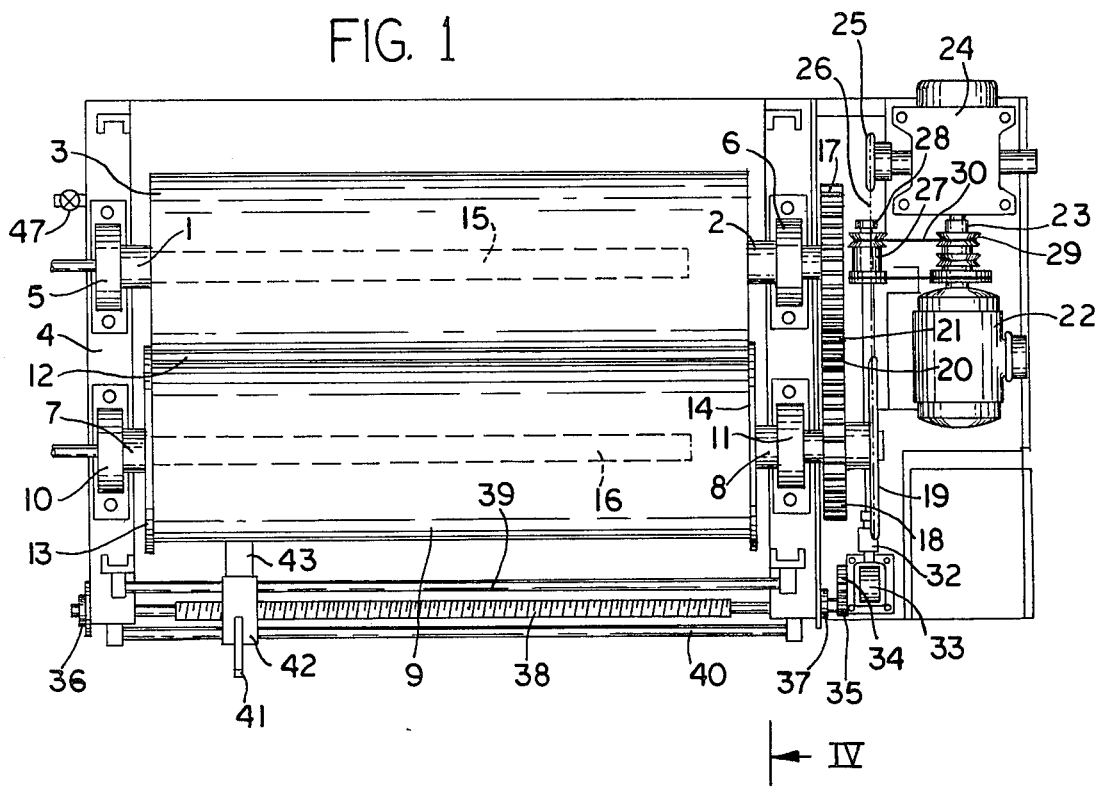
FIG. 1 is a plan view of a regenerating apparatus for foamed plastics in accordance with the present invention.
Figure 2:
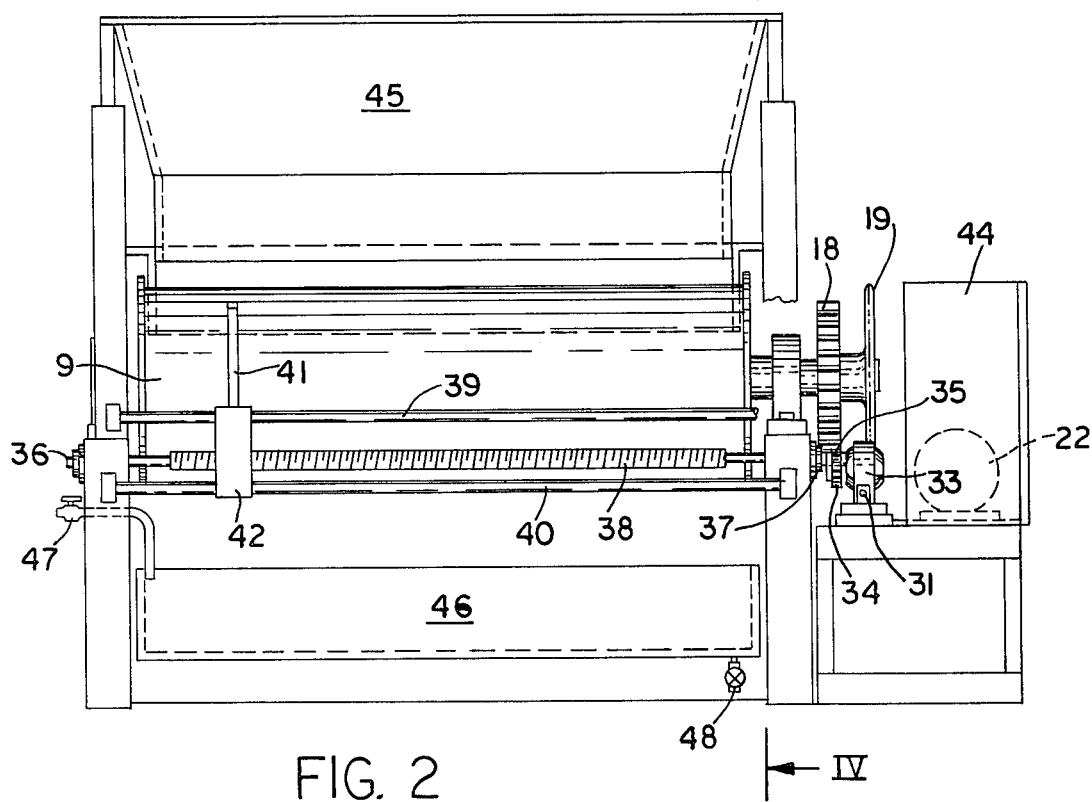
FIG. 2 is a side view of the apparatus.
Figure 3:
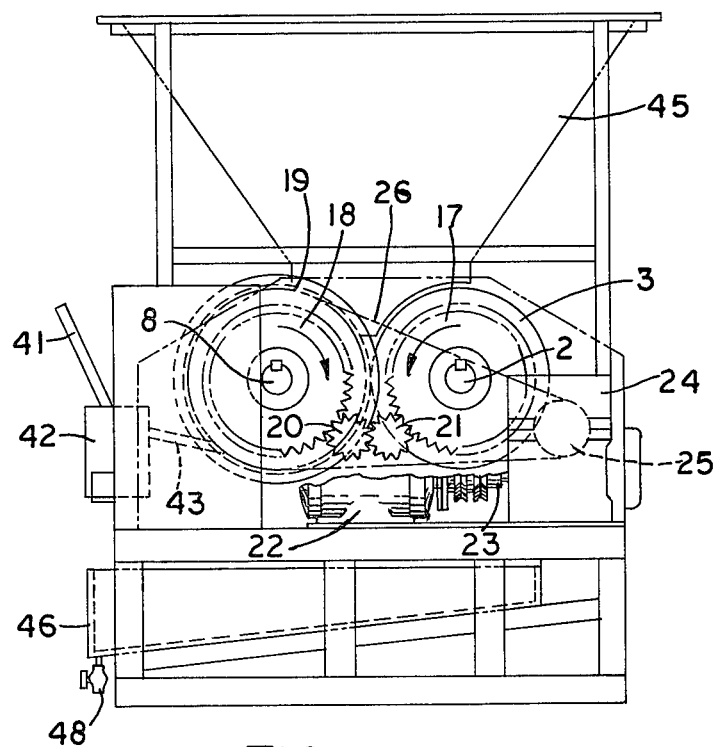
FIG. 3 is an elevational view of the apparatus.

As shown in FIGS. 1 to 3, a first roller 3 is supported at both ends thereof by axial trunnions 1 and 2 rotatably journaled in bearings 5 and 6 fixed to both ends of a machine frame 4 and is mounted generally horizontally. A second roller 9 secured at both ends thereof to axial trunnions 7 and 8 is also rotatably journaled in bearings 10 and 11 fixed on both ends of the machine frame 4 and is mounted in parallel with the first roller 3. The first roller 3 and the second roller 9 are spaced apart by a gap 12 sufficient to pass therethrough only the plastics melted on these rollers but not the foamed plastics to be regenerated. Flanges 13 and 14 are secured to both ends of the second roller 9 so that neither the foamed plastics supplied nor the molten plastics can escape as described latter and the outer edges of the flanges are contacted respectively at one position to both ends of the roller 3.

The first roller 3 and the second roller 9 are respectively provided with heating means 15 and 16 therein. Conventional heating means such as electrical heating, gas burner heating and circulation of heat transmission medium can be employed. Heat generating bodies are provided either along the center axial line of the roller or the inner circumferential face of the roller, for example, in electrical heating. A burner 15 or 16 connected to a feed pipe (not shown) is disposed along the center axial line of the roller and an exhaust port for combustion gas (not shown) is formed at least on one end of the roller in the case of gas burner heating.

A first gear 17 is coaxially secured to the end of the trunnion 2 for the first roller 3, and a second gear 18 and a second sprocket 19 are coaxially secured to the end of the trunnion 8 for the second roller 9. The first and the second gears 17 and 18, respectively, mesh with idler gears 20 and 21 which, in turn, mesh with each other. Reference numeral 22 denotes a power source such as a motor, which is connected by way of a shaft 23 to a speed reduction worm 24. The speed reduction worm 24 is mounted with a first sprocket 25 which is connected by way of a chain 26 to the second sprocket 19.

Reference numeral 27 denotes a double magnet clutch supported on a pillow block 28 and connected by way of a belt 30 with a pulley 29 axially secured to the shaft 23. The clutch 27 is coaxially mounted with a transmission shaft 31 whose one end is connected by way of coupling 32 to a speed reduction worm 33. The speed reduction worm 33 is mounted with a gear 34 meshing with a gear 35. The gear 35 is connected to an elongate screw 38 which is rotatably supported by bearings 36 and 37 fixed to both ends of the machine frame 4 in parallel with the second roller 9. Two guide bars 39 and 40 are mounted to the machine frame 4 in parallel with the elongate screw 38. A scraper 42 having a handle 41 and engaged to the elongate screw 38 is slidably mounted to the guide bars 39 and 40. Reference numeral 43 is a blade for the scraper 42 and 44 is a control board.

A hopper 45 is provided above the first and the second rollers 3 and 9 in such a way that the opening at its bottom is situated above the upper surface of the rollers and generally inside of each of their axial centers. A tank 46 is disposed under the rollers. Reference numberal 47 denotes a water feed cock and 48 denotes a water drain cock.

Reference will now be made to the method of regenerating foamed plastics using the apparatus in accordance with the present invention with foamed polystyrene as an example. A switch (not shown) on the control board 44 is first turned on to actuate heating means 15 and 16 to heat of the rollers to their predetermined temperature respectively, for example, 220°–230° C. for the first roller 3 and 200° C. for the second roller 9. While on the other hand, water is previously charged in the tank 46 by the opening of the water feed cock 47. Then, the motor 22 is started to rotate the rollers 3 and 9. The power of the motor 22 is transmitted by way of the shafts 23 to the speed reduction worm 24 to rotate the first sprocket 25 at a predetermined speed. The rotational force of the first sprocket 25 is transmitted by way of the chain 26 to the second sprocket 19 to rotate the trunnion 8. The rotation of the support shaft 8 causes the second gear 18 and the second roller 9 coaxially fixed thereto to move toward inside (clockwise direction in FIG. 3). Then, the rotation is transmitted by way of the idle gears 20 and 21 to the first gear 17 and, as the result, the first roller 3 secured coaxially to the first gear 17 by the support shaft 2 trunnion 2, it is rotated toward inside (counterclockwise direction in FIG. 3).

Then, when scrap pieces or particles of foamed plastics, for example, foamed polystyrene are supplied to the hopper 45 using a belt conveyor (not shown), if necessary, the scrap pieces fall on the surface of the first and second rollers 3 and 9 heated to predetermined temperature and they are gathered together toward inside by the rotation of the rollers. Then, scrap pieces pass through the gap 12 between the two rollers while melted under heating, whereby there are completely defoamed through heat compression (degassing) into paste-like melts and deposit on the surface of the second roller 9.

Figure 4:
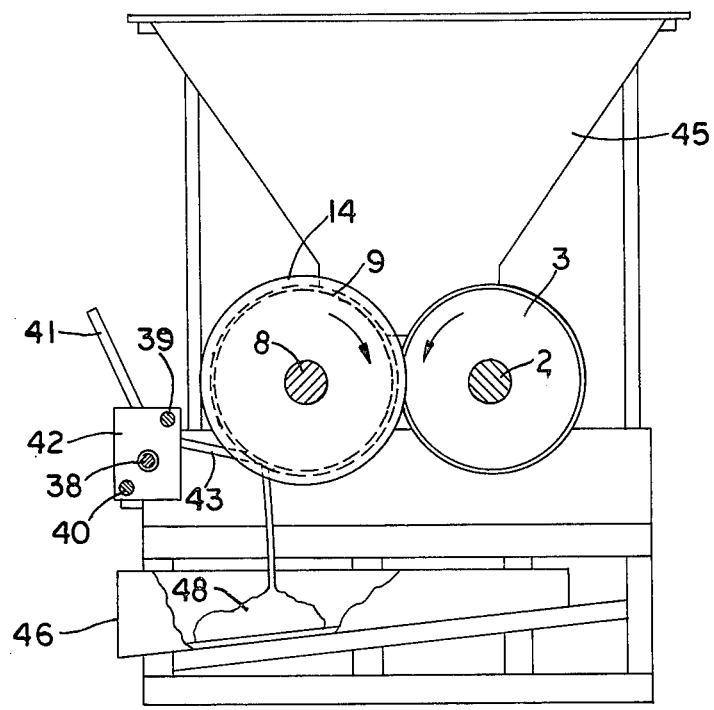
FIG. 4 is a cross-sectional view taken along line IV—IV of FIG. 2.

Meanwhile the double magnet clutch 27 is actuated by the rotation of the pulley 29 fixed to the shaft 23 of the motor 22 by way of belt 30 to rotate the transmission shaft 31 which rotation is transmitted through the speed reduction worm 33 to the gears 34 and 35 and, in turn, to the elongate screw 38. Consequently, as more particularly illustrated in FIG. 4, the blade tip of the blade 43 on the scraper 42 comes in contact with the surface of the second roller 9 upon pulling the handle 41 to this side and the molten plastic (molten polystyrene) deposited on the roller surface is scraped off by the blade 43 and falls into water in the tank 46 where it is cooled to a solid to obtain a desired block 48 of defoamed plastics. The scraper 42 is caused to slide along the guide bars 39 and 40 by means of elongate screw 38 while the blade 43 is in contact with the surface of the second roller 9. The solidified block 48 is recovered from the water and can be reused as plastic (polystyrene). In the above operation, a constant amount of water is discharged by the opening of the water drain cock 48 while charging water from the water feed cock 47.

While the descriptions have been made for the case where the plastic particles are melted only on one of the rollers. by making a difference in the heating temperature between the first roller 3 and second roller 9, the molten plastic can also be deposited to the surface of both of the rollers by providing scraping means for molten plastic to the outside of each of the rollers respectively and heating both of the rollers about to a same temperature. The heating temperature for the rollers may be adequately varied depending on the melting point of foamed plastic to be disposed.

What is claimed is:

1. A process for regenerating foamed thermoplastic particulate material which comprises feeding particles of foamed thermoplastic material from a feeding means onto a continuous surface, successive increments of which successively and repeatedly pass under said feeding means, heating said continuous surface to a temperature above the melting point of said material, moving said continuous surface past said feeding means until particles of said material fall upon material already fed onto said surface, whereby fresh particles of said material fall upon material already melted or partly melted, heat-compressing the particles on said surface while melted under heating, and removing said molten material from said continuous surface incrementally, transversely of the direction of motion of said surface past said feeding means.

2. A process as defined in claim 1, in which the molten said material is removed from said continuous surface in a relatively thin strip which moves transversely across said continuous surface.

3. A process as defined in claim 2, in which said continuous surface is cylindrical and in which said thin strip moves transversely across said cylindrical surface.

4. A process as defined in claim 2, in which the second continuous cylindrical surface moves along with the first continuous cylindrical surface and provides a narrow gap in which particles of said foamed thermoplastic material melted under heating are subjected to heat compression to degassify the same.

5. A regenerating apparatus for foamed thermoplastic material, comprising two rollers connected to driving means capable of rotating them so that their top surfaces move toward each other and mounted horizontally in parallel with each other at a predetermined gap, a heating means inside of at least one roller, having a heating capacity sufficient to melt the plastic material on the surface thereof, feeding means above said gap for feeding. particles of foamed thermoplastic material to the upper surface of said rollers, and scraping means which is driven in a transverse direction across the surface of a roller which has molten plastic thereon and which is operative for removing a narrow strip of the molten plastic material from the roller which has the molten plastic thereon, which strip is narrower than the width of said roller, so that the remainder of the molten plastic on said roller stays thereon for a plurality of passes to and from the feeding means.

6. An apparatus as defined in claim 1, wherein the gap between the first roller and the second roller is sufficiently narrow to defoam the melted foamed plastic material through heat compression and to pass only the molten defoamed plastic material therethrough.

7. An apparatus as defined in claim 1, wherein the scraping means is located to remove molten plastic from the rising surface of the roller after the nadir.

8. In a regenerating apparatus for foamed thermoplastic material comprising two rollers which are connected to driving means capable of rotating them so that their top surfaces move toward each other and are mounted horizontally in parallel with each other at a predetermined narrow gap, a heating means inside of the rollers, and a scraping means for scraping molten plastic material from the outside of at least one of the rollers, the combination, wherein the heating means for at least one roller has sufficient heating capacity to melt the plastic material on the surface thereof, wherein the scraping means is relatively narrow with respect to the width of said rollers and is mounted in scraping contact with a portion of the outside of the roller on which molten plastic material is deposited, and wherein the scraping means is mounted to move in a horizontal direction while contacting the surface of the roller.

9. An apparatus as defined in claim 8, wherein said scraping means contacts said roller on the rising surface thereof, after the nadir.

10. An apparatus as defined in claim 8, wherein said narrow gap is insufficiently wide to pass particles of the foamed thermoplastic material to be regenerated except while melted under heating.

11. Apparatus for regenerating foamed thermoplastic particulate material comprising a feeding means, a continuous surface mounted for movement continuously past said feeding means so that successive increments of said surface are brought into feeding relation to said feeding means, said feeding means being operative for feeding particles of said material onto said surface as succesive increments thereof pass under said feeding means, heating means for heating said continuous surface to a temperature sufficiently high to melt said material, heat compression means for degassing particles of foamed material while melted under heating, and removing means for removing said molten material from said continuous surface incrementally, transversely of the direction of motion of said surface past said feeding means.

12. An apparatus as defined in claim 11, in which said removing means operates to remove molten said material in a relatively thin strip which moves transversely across said continuous surface.

13. An apparatus as defined in claim 12, in which said continuous surface is cylindrical and in which the removing means is a scraper means which moves transversely across said cylindrical surface.

14. An apparatus as described in claim 13, in which said compression means comprises a second cylindrical surface apposed to the first cylindrical surface and separated therefrom by a gap sufficiently narrow that the particles of foamed material to be regenerated cannot pass therethrough without being compressed.

* * * * *

UNITED STATES PATENT AND TRADEMARK OFFICE
CERTIFICATE OF CORRECTION

PATENT NO. : 4,254,068

DATED : March 3, 1981

INVENTOR(S) : Kazuo Otsuka

It is certified that error appears in the above-identified patent and that said Letters Patent are hereby corrected as shown below:

[73] ASSIGNEE: "Kabushiki" should read -- Kabusiki -- (ASSIGNMENT, Reel 3614 Frame 434.)

Col. 2, line 65; "of coupling" should read -- of a coupling --

Col. 3, lines 12 & 13; "numberal" should read -- numeral --

Col. 3, line 31; "support shaft" should read -- trunnion --  Response and Amendment dated March 7, 1980, page 2.

Col. 3, line 37; delete "support shaft 2"  Response and Amendment dated March 7, 1980, page 3.

Col. 4, line 7; delete the period "." after "rollers"  Response and Amendment dated March 7, 1980, page 3.

Col. 4, lines 55 & 56; delete the period "." after "feeding"  Response and Amendment dated March 7, 1980, page 3, claim 1, line 7.

Signed and Sealed this

First Day of September 1981

[SEAL]

*Attest:*

*Attesting Officer*

GERALD J. MOSSINGHOFF

*Commissioner of Patents and Trademarks*